ELECTRONIC SWITCHING TELEPHONE SYSTEM

Filed Jan. 24, 1961 3 Sheets-Sheet 1

INVENTOR.
VIRGLE E. PORTER
BY J. Warren Whitesel
ATTORNEY

April 6, 1965 V. E. PORTER 3,177,291

ELECTRONIC SWITCHING TELEPHONE SYSTEM

Filed Jan. 24, 1961 3 Sheets-Sheet 2

April 6, 1965 V. E. PORTER 3,177,291

ELECTRONIC SWITCHING TELEPHONE SYSTEM

Filed Jan. 24. 1961 3 Sheets-Sheet 3

3,177,291

ELECTRONIC SWITCHING TELEPHONE SYSTEM

Virgle E. Porter, Country Club Hills, Ill., assignor to International Telephone and Telegraph Corporation Filed Jan. 24, 1961, Ser. No. 84,557
14 Claims. (Cl. 179—18)

This invention relates to telephone systems and more particularly to electronic switching telephone systems.

In known telephone systems, a plurality of vertical and horizontal multiples are arranged to provide intersecting crosspoints, each multiple including message carrying and control conductors. Each crosspoint includes switching means for effectively coupling the message carrying conductors that intersect at the crosspoints. It has sometimes been the practice also to include a memory or control device at each crosspoint, which device is operated or released responsive to a coincidence of signals on the control conductors that intersect at such crosspoint. These memory devices turn "on" or turn "off" the switching means at the crosspoint, "remember" whether it is "on" or "off," and control it accordingly.

The systems including memory devices at each crosspoint have sometimes required expensive, unreliable components and complicated control circuits. For example, when electro-mechanical crosspoints are used, there is an extremely high level of electrical reliability because open contacts provide an infinitely large resistance and closed contacts provide an infinitesimally small resistance between the talking conductors. However, these same contacts are not mechanically reliable and may open or close if jarred or improperly mounted. Moreover, these contacts are sometimes subject to contamination unless sealed in glass, and the glass may break under certain conditions. If electronic crosspoints are used, the resulting system may have electrical characteristics which make it difficult to interconnect electronic switching systems with existing telephone equipment. To overcome these and other problems, it has been necessary to provide extremely expensive installations with high maintenance costs, large power supplies, and complex maintenance problems, all of which make it difficult to provide small, compact, portable telephone exchanges.

Accordingly, it is an object of this invention to provide new and improved electronic switching telephone systems and more particularly to provide improved crosspoints for use in such systems.

Another object of this invention is to provide an integrated telephone system featuring line circuits and crosspoint matrices which cooperate to provide telephone switching functions with a minimum number of components.

Yet another object of this invention is to provide crosspoints having improved memory devices which control electronic switches and transmit busy indicating signals when the crosspoint is closed. In this connection, it is an object of this invention to provide improved switching techniques utilizing the best features of magnetic and semi-conductor logic elements.

In accordance with one aspect of this invention, an electronic switching telephone system is provided with a crosspoint matrix including horizontal and vertical multiples, each multiple comprising message carrying and control conductors. The message carrying conductors which intersect at a crosspoint are effectively coupled together by an electronic switching means. These electronic switching means operate during discrete time frames in conjunction with a magnetic device, here shown as a saturable reactor having a control winding connected between the control conductors that intersect at a crosspoint.

In carrying out this invention, the saturable reactor is used to control the transmission of busy and idle line markings. More specifically, before a crosspoint fires the core flux of the saturable reactor is resting at saturation in a first magnetic direction. During each time frame which identifies an associated station, the core flux is driven toward, but not to, saturation in the opposite direction. Substantially all energy applied during each time frame goes to change core flux and very little current flows through the winding. When that time frame terminates, core flux is driven back to saturation in the first direction. When a crosspoint fires, the core flux is driven all the way to saturation in the opposite direction. Thereafter, during each time frame which identifies an associated station substantially no applied energy is dissipated by changing core flux and a very large current flows as a busy marking. The change in current flow brought about by saturation of the core prevents a double connection in the matrix.

The above mentioned and other features and objects of this invention and the manner of obtaining them will become more apparent and the invention itself will be best understood by making reference to the following description of an embodiment of the invention taken in conjunction with the accompanying drawings wherein.

Figures 1, 2, 3, 4, 5, 6:
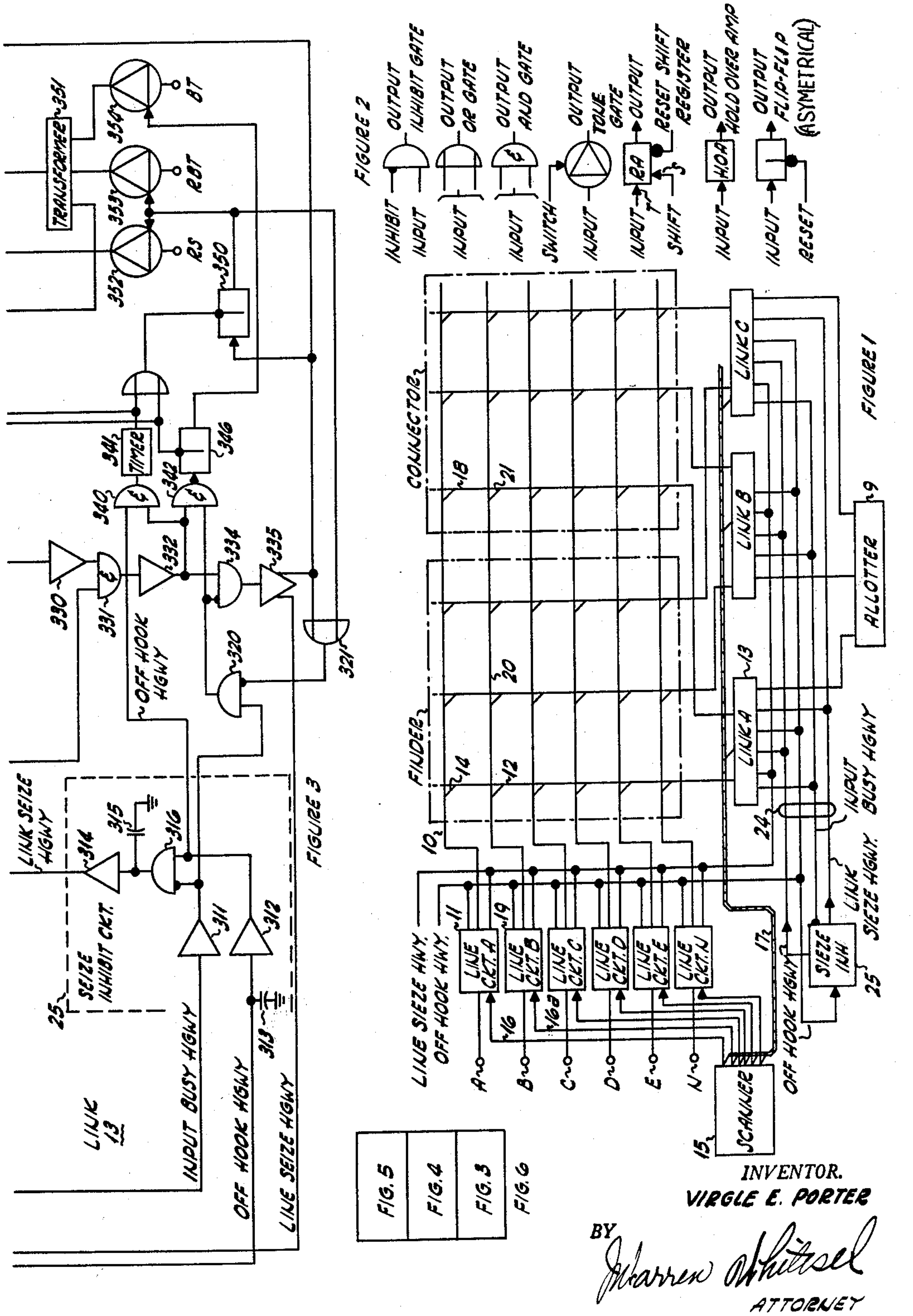
FIG. 1 is a block diagram showing a telephone system incorporating this invention.
FIG. 2 shows the logic symbols used elsewhere in the drawings.
FIGS. 3–5 are a schematic circuit diagram showing details of the circuit used to complete the hollow boxes of FIG. 1.
Figure 4:
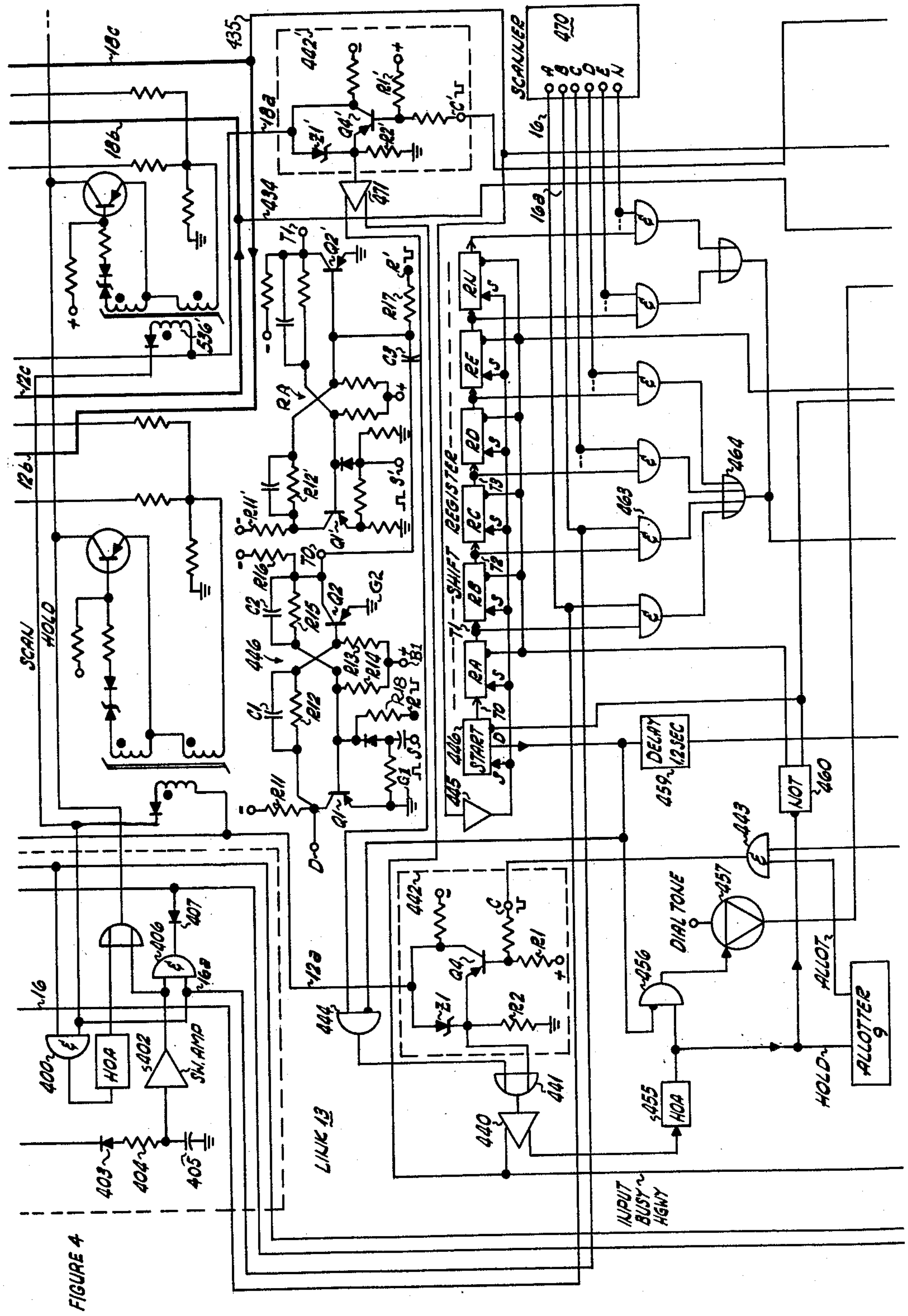
Figure 5:
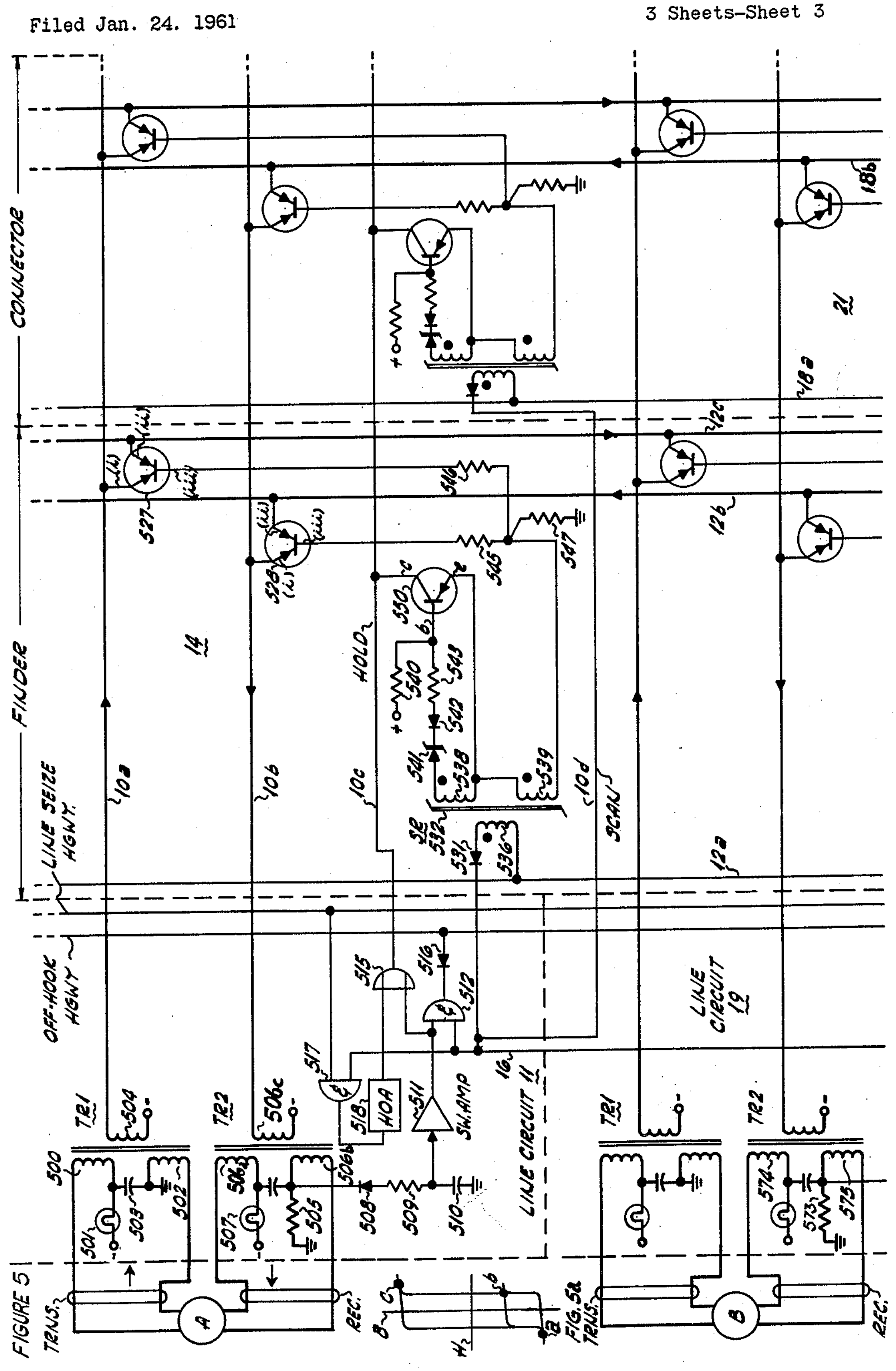

FIG. *5a* is an idealized hysteresis loop trace which is helpful toward an understanding of how the saturable reactor operates; and FIG. 6 shows how FIGS. 3–5 should be joined to provide a complete and understandable circuit.

*Brief description*

As shown in FIG. 1, an exemplary telephone system incorporating this invention includes a number of subscriber stations marked A–N, a pair of electronic crosspoint matrices marked "FINDER" and "CONNECTOR," and control equipment including links, allotter, and common highways. The allotter 9 preassigns each idle link in turn to serve the next call extended through the exchange and then steps on to assign the next idle link after such call is initiated. The common highways include an "INPUT BUSY HIGHWAY," a "LINK SEIZE HIGHWAY," an "OFF-HOOK HIGHWAY," and a "LINE SEIZE HIGHWAY." Signals applied over these common highways provide means for giving a common control over the telephone exchange.

The matrices include a plurality of horizontal and vertical multiples, each of which has at least one message carrying conductor and a control conductor. Each horizontal multiple (such as 10) is individually associated with a subscriber station (such as station A via line circuit 11). Each vertical multiple (such as 12) is individually associated with a link circuit (such as 13) that includes the control equipment necessary to complete an individual call. The horizontal and vertical multiples are arranged to provide a number of intersecting crosspoints, as shown at 14, 21, for example.

The time frames used to control the crosspoint switches emanate from a scanner 15 which is a clock-like device that provides cyclically recurring pulses, each of which individually identifies a subscriber station. Thus, subscriber station A is identified by a first pulse applied over conductor 16 to line circuit 11, subscriber station B is identified by a second and later pulse applied over conductor 16*a*, etc. The scanner also transmits all of its pulses over a cable 17 to each of the link circuits. Each link circuit is adapted to select a desired one of the time frame pulses appearing on the cable 17 and, during that time frame, to apply a marking to the individually associated vertical multiples (such as multiples 12, 18 in the case of link circuit 13). If the line circuit 11 is then marking the horizontal multiple 10, the crosspoint 14 fires and if the line circuit 19 is then marking the horizontal multiple 20, the crosspoint 21 fires. Other crosspoints are fired in a similar manner. After crosspoints 14 and 21 fire, subscriber station A is connected to subscriber station B on a space switching basis via these fired crosspoints 14, 21 and the link circuit 13. Thereafter, and for the duration of the call, the crosspoints 14, 21 transmit a busy indicating pulse to the link circuit 13 during each time frame that identifies subscriber stations A, B. Link circuit 13 applies a busy pulse to the "INPUT BUSY HIGHWAY" during these same time frames to prevent any other link from connecting with stations A, B.

Means are provided for preventing simultaneous connections to a single station via a plurality of links. More specifically, a seize inhibit circuit 25 is interposed between the "OFF-HOOK HIGHWAY" and the link circuits to prevent simultaneous operation of more than one link circuit at any given time and, further, to prevent a link from operating during a time frame which identifies a busy station. The circuit 25 operates in the following manner. Before a call is placed by or extended to a specific station, no busy marking pulses are applied to the "INPUT BUSY HIGHWAY" during the time frames which identify that specific station. Therefore, the seize inhibit circuit 25 pulses the "LINK SEIZE HIGHWAY" during such time frames if a call is extended from a calling station, as indicated by a pulse on the "OFF-HOOK HIGHWAY." This pulse triggers an allotted link to complete the call through the matrices to that station during its identifying time frame. After the call is completed to that specific station, the link serving that call pulses the "INPUT BUSY HIGHWAY" during each time frame that identifies the calling, called, and all other connected stations. These pulses inhibit the seize inhibit circuit 25 to prevent it from pulsing the "LINK SEIZE HIGHWAY," thus preventing any other link from completing a call to those stations.

In FIGS. 3–5 and the description which follows, the circuitry used to complete the system of FIG. 1 is shown and described by a number of logic symbols which are individually shown in FIG. 2. More specifically, an "inhibit" gate is shown by a semi-circle having input, inhibit, and output terminals. If the inhibit terminal is energized, no current can flow through the inhibit gate. If the inhibit terminal is not energized, any signals appearing on the input terminal are conducted through the gate to the output terminal are conducted through the gate to the output terminal.

An "OR" gate is shown by a semi-circle having a number of input terminals which intersect the chord line. Energization of any input terminal of an "OR" gate causes a signal to appear on the output terminal.

An "AND" gate is shown by a semi-circle including an ampersand. When all input terminals of an "AND" gate are energized simultaneously, a signal appears on an output terminal.

A "tone gate" is shown by a triangle enclosed within a circle. Any signal appearing on its input terminal is applied to its output terminal if the switch conductor (marked by an arrowhead) is then energized. Deenergization of the switch terminal prevents any signal from appearing on the output terminal.

A "shift register" stage is shown as a hollow block enclosing the letter "R" and a suffix "A," "B," "C" . . . "N" indicating the position of the stage in a shift register. For example, if a register stage "A" is switched "on," it identifies a subscriber station A. Likewise, if a register stage "N" is turned "on," it identifies a subscriber station N. When the input and shift terminals are pulsed simultaneously, the register stage turns "on" to energize the output conductor. When the reset terminal (marked by the heavily inked dot) is pulsed, the stage turns "off" to deenergize the output terminal. The circuit details of this register are also shown in FIG. 4.

A "holdover amplifier" is indicated by a rectangle having the letters "HOA" therein. This amplifier is designed to provide a steady output signal if pulses recur at the input within a predetermined time limit. For one example of a device such as this, reference is made to a U.S. patent application S.N. 841,190, filed by H. K. Ligotky on September 21, 1959, now U.S. Patent No. 3,093,753, and assigned to the assignee of this invention.

Finally, a circuit sometimes called a "flip-flip" or a "flip-flop" is shown by a rectangle bisected by a line. If the input terminal is pulsed, the flip-flip turns "on" and energizes the output terminal thereby remembering the occurence of the input pulse. This output terminal continues to be energized until the reset terminal (marked by a heavily inked dot) is energized to turn "off" the flip-flip and terminate the output signal, thus forgetting the occurrence of the input signal and remembering the occurence of the reset signal.

*Detailed description*

It is thought that the principles of the invention may be better understood by making reference to FIGS. 3–5 which show details of the electronic circuitry incorporated into the telephone switching system of FIG. 1.

The subscriber stations A, B are shown as the four-wire variety which connect to switching equipment via a transmit pair of conductors "TRNS" and a receive pair of conductors "REC." Each subscriber line is terminated by an individually associated line circuit 11, 19 including a pair of transformers TR1, TR2. The primaries of these transformers are connected in a balanced circuit to the subscriber lines and the secondaries of these transformers are connected in an unbalanced circuit to electronic crosspoints via the horizontal multiple 10, in the case of station A. An advantage of the balanced external connection to the line is that the circuits tend to maintain fidelity despite variation of line impedance as well as the avoidance of ground loops. An advantage of the unbalanced internal connection is that the number of crosspoint switches required is reduced by one-half.

*Line circuit.*—The balanced circuit of the transmit pair "TRNS." A difference between the transmit and re-through the upper primary winding 500, and a lamp 501 to a negative source of potential and through the lower winding 502 to ground. Thus, the lamp 501 lights as an aid for maintenance personnel, if a short circuit occurs on the line. These ground and negative potential sources provide the common talking battery (telephone transmitter power). Connected between the upper and lower primary windings 500, 502 is a capacitor 503 which is an A.C. short circuit at voice frequencies so that the speech voltage appears almost entirely across the transformer primary winding.

The unbalanced circuit may be traced from a negative battery connected to the lower terminal of the secondary winding 504 over a message carrying conductor 10*a* to an emitter-collector (i) of all electronic switches incorporated in the associated horizontal multiple of the switching matrices.

The receive pair "REC" is connected to the crosspoint matrix via the transformer TR2 in a manner similar to that described above in connection with the transmit pair "TRNS." A difference between the transmit and receive connections is that a resistor 505 is connected in series between the lower primary winding 506 and ground to provide a current detector. That is, an off-hook telephone at station A puts a D.C. short circuit across the talking conductors of the telephone receive pair "REC." Thus, after subscriber station A goes off-hook, the current flow through the primary winding 506 develops a voltage drop across resistor 505 and the extremity of a supervisory circuit 508–510.

The supervisory circuit connected between the current detecting resistor 505 and ground includes an isolating diode 508 and an R.C. network 509, 510. The capacitor 510 slowly charges and discharges during dialing to prevent dial pulses from appearing as rapid on-hook and off-hook supervisory signals. More specifically, conventional open loop pulses are generated by a telephone dial connected across the receive pair "REC" at the subscriber's station. When the digit "one" is dialed the D.C. loop across the receive pair "REC" is broken and reestablished once. When the digit "two" is dialed, the loop is broken twice, etc. The time constant of the capacitor 510 is such that it supplies a voltage to a switch amplifier 511 normally supplied over the completed talking conductors if the open loop condition does not persist for a time period which is longer than the normal dial pulse.

To provide for the detection of off-hook conditions, the electronic switch amplifier 511 energizes an upper input of an "AND" gate 512 and the lower input of an "OR" gate 515 when the D.C. loop is closed across the receive pair "REC." The lower input of the "AND" gate 512 is energized over the conductor 16 which individually couples the line circuit 11 to the scanner 470 and which is energized during a particular time frame that identifies the subscriber station A. In this manner, it is apparent that a coincidence between an off-hook condition on the receive pair "REC" and of a pulse from the scanner during the time frame that identifies the subscriber station A results in an energization of the "AND" gate 512. The output of "AND" gate 512 is applied through an isolating diode 516 to the "OFF-HOOK" highway to inform an assigned link of the occurrence of a call.

To extend a connection through the "CONNECTOR" matrix, another "AND" gate 517 has its lower input energized from the scanner via conductor 16 during the time frame which identifies the associated subscriber station A and its upper input energized by a pulse applied to the "LINE SEIZE" highway from a link circuit during the same time frame. Thus, the coincidence of a seize pulse and a time frame pulse which identifies the associated station A causes the "AND" gate 517 to energize a holdover amplifier 518. The holdover amplifier integrates the scan pulses and maintains a continuous output voltage on the control conductor 10*c* to sustain the electronic crosspoint switches. Thus, the crosspoint matrix is supplied with sustaining voltage either when the switch amplifier 511 energizes the lower input of the "OR" gate 515 responsive to an off-hook signal or when the holdover amplifier energizes the upper input of the "OR" gate 515 responsive to control signals from the link circuit.

*Crosspoint.*—Next, reference is made to the details of the electronic crosspoint 14, by way of example. The other crosspoints are the same. Upon inspection of the drawings, it will be seen that the crosspoint 14 is located at the intersection of a first group of conductors which form the horizontal multiple 10 and a second group of conductors which form the vertical multiple 12. The first group includes, as a speech path, a pair of message carrying conductors 10*a*, 10*b*, and a pair of control conductors 10*c*, 10*d*. The second group also includes, as a speech path, a pair of message carrying conductors 12*b*, 12*c* and a control conductor 12*a*.

As here shown, the horizontal multiple message carrying conductors 10*a*, 10*b* are connected from the secondary windings of the transformers TR1, TR2 in the line circuit 11 to the emitter-collectors (i) of a pair of bilateral transistors 527, 528. One of the control conductors of the horizontal multiples is the "HOLD" conductor 10*c* which is energized either by the holdover amplifier 518 or by the switch amplifier 511 depending upon whether the line circuit serves a calling or a called line. Thus, as long as the associated telephone station A is in an off-hook condition or the line is in a called condition, an energizing potential is applied to the "HOLD" conductor by the line circuit. Also, the horizontal multiple includes another control conductor 10*d* marked "SCAN." This scan conductor is the one which extends from the scanner 470 through the associated line circuit 11 to provide a station identifying time frame. Thus, the "SCAN" conductor 10*d* is pulsed during each time frame which identifies station A. Both the "HOLD" and the "SCAN" lines extend across an entire horizontal multiple and are effective at every cross-point of that multiple.

The vertical multiples include a pair of speech path conductors 12*b*, 12*c*, which connect directly to a corresponding pair 18*b*, 18*c* in the connector matrix. Each vertical includes a control highway 12*a*, 18*a* which extends to the individually associated link circuit 13. When an allotter preassigns a link to serve the next call, these vertical control highways 12*a*, 18*a* are energized from the link. When a call is in progress these vertical control highways are pulsed through a fired crosspoint during each station identifying time frame. The speech paths or message carrying conductors 10*a*, 10*b* of the horizontal multiple are effectively coupled to the speech path or mesasge carrying conductors 12*b*, 12*c* of the vertical multiple when the bilateral transistors 527, 528 are biased "on."

The principal components of the crosspoint are a pair of electronic switch means 527, 528 which are here shown as bilateral transistors. Also included in the crosspoint is a memory device comprising a saturable reactor SR and an electronic switch 550. It is not necessary for the hysteresis loop of the saturable reactor core to have any particular configuration; however, in view of the availability of modern square hysteresis loop cores, it is very convenient to use them, the loop of one such core being shown in FIG. 5*a*. In the exemplary construction the electronic switch 550 was an RCA type TA1832 thyristor. The characteristics of a thyristor are such that once turned "on" by a base current flow, it remains "on" until sustaining current is sufficiently reduced or removed from one of its electrodes, the collector in this case.

The saturable reactor SR includes a core 532, a control winding 536 and a pair of secondary windings 538, 539. The control winding 536 is connected between the "SCAN" or horizontal control conductor 10*d* and the vertical control highway 12*a* by way of an isolating diode 531. The control winding 536 is energized when a link applies a ground potential to the vertical control highway 12*a* and the scanner 470 applies a pulse to the horizontal control highway 10*d* during a time frame which identifies a telephone station in an off-hook or called condition. Thus, the core of the saturable reactor SR is driven toward saturation in a first magnetic direction responsive to the simultaneous energization of these two control conductors.

To control the saturable reactor, the pair of secondary windings 538, 539 are connected between (+) battery and ground by a series circuit traced through resistors 540, 543, diodes 542, 541, windings 538, 539, and resistor 547 to ground. The zener diode 541 establishes a threshhold voltage for turning "on" the thyristor 550 and the rectifying diode 542 prevents the thyristor from turning "off" responsive to transients occurring after it fires. Also included in the series circuit is the current limiting resistor 543 which protects the zener diode and thyristor. The resistor 540 provides an antibias potential for preventing the thyristor 550 from turning itself "on" at elevated temperatures.

To control a switching of the thyristor 550 between "on" and "off" conditions, a collector supply potential is applied to and removed from the "HOLD" conductor 10c under the control of switch amplifier 511 or the holdover amplifier 518. To turn "on" the thyristor, core flux excursion during saturation induces a pulse in winding 539 to cause the base current flow that turns "on" the thyristor.

Normally, the bilateral transistors 527, 528 are switched "off" by a ground potential applied to their base electrodes (iii) via resistors 545–547 (with the emitters and collectors referenced to a negative voltage). These transistors are switched "on" when the thyristor fires because a negative potential on the hold conductor 10c is applied to the base electrodes (iii) which overcomes the negative voltage from the line transformers, as at winding 504, for example.

The crosspoint circuit operates in the following manner. Before subscriber station A goes off-hook or is called, the core 532 of the saturable reactor SR is saturated in a magnetic direction determined by the flow of current through the secondary winding 539, the circuit being that traced from battery through resistor 540, thyristor 550 (the thyristor exhibits a low zener voltage from base to emitter), winding 539 and resistor 547 to ground.

Cyclically and sequentially during each time frame which identifies subscriber station A the scanner 470 pulses conductor 16 and, therefore, winding 536 to drive core flux toward, but not to, an opposite level of magnetic saturation. Referring to FIG. 5*a*, the idle line saturation level is arbitrarily identified as the negative saturation, point *a*. The core flux change produced by an appearance of the time frame pulse which identifies subscriber station A is identified by point *b*. After termination of this time frame pulse, current flow through winding 539 drives the core flux back to point *a* on the hysteresis loop of FIG. 5*a*. During the time frame pulse just described, substantially all energy applied across winding 536 goes to change the level of core flux; therefore, a relatively low potential appears on the vertical control conductor 12*a*.

Means are provided for firing the crosspoint and storing a memory thereof. More specifically, when subscriber station A goes off-hook, switch amplifier 511 negatively energizes the "HOLD" conductor 10*c*; or, when station A is called, the holdover amplifier 518 negatively energizes the "HOLD" conductor 10*c*. The link 13 selectively energizes conductor 12*a* by grounding it during the time frame that identifies station A and the control winding 536 is energized. A pulse is induced in winding 538 and thyristor 550 switches "on." A relatively heavy current flows from ground through resistor 547, winding 539, emitter *e*, and collector *c* of thyristor 550 to the negative "HOLD" conductor 10*c*. Current flow through winding 539, in this direction, aids the current in winding 536 and helps drive core flux to positive saturation at point *c* of FIG. 5*a*. After saturation, current from the negative conductor 10*c* through the winding 539 holds the core flux at point *c*. The fired thyristor and positively saturated core constitute a memory of the fired crosspoint. Also, the voltage drop across resistor 547 changes with this current flow to switch "on" the bilateral transistors 527, 528. The speech path or message carrying conductors 10*a*, 10*b* are now effectively coupled to the speech path or message carrying conductors 12*c*, 12*b*.

A busy pulse is thereafter transmitted to the link circuit 13 during each time frame which identifies station A. Specifically, when the scanner 470 applies a pulse to conductor 16, current flows through diode 531 and winding 536 to the vertical control conductor 12*a*. Since core flux is now at the level *c* (FIG. 5*a*) substantially none of the energy applied by the scanner 470 goes to change the level of core flux and a relatively high potential is applied to conductor 12*a*. This high potential is the busy pulse that prevents a double connection with a single subscriber station.

When the crosspoint fires responsive to a call to the associated line, conductor 10*c* is initially energized by the holdover amplifier 518. If the called party does not answer, conductor 10*c* is deenergized when the calling subscriber hangs-up to terminate the seize pulses applied to the "LINE SEIZE HIGHWAY." If the called party does answer, the link 13 detects the busy pulse and terminates the seize pulses. However, this has no effect because the switch amplifier 511 is applying a negative potential to hold conductor 10*c* for supplying collector current to thyristor 550.

After a call is completed, and when the subscriber hangs-up, the collector supply is removed from the hold conductor 10*c* because the holdover amplifier 518 turns "off." After the collector supply is removed, thyristor 550 turns "off," current flow through the thyristor terminates, the base electrodes (iii) of transistors 527, 528 go to the ground supplied through the load resistor 547 and bilateral transistors 527, 528 turn "off." The core flux of the saturable reactor SR returns to the saturation level (point *a*) which marks an idle crosspoint.

An advantage of this arrangement is that the line circuit and crosspoint matrices cooperate to provide an integrated telephone system having a minimum number of components. Extremely stable and reliable magnetic cores are used to control the crosspoints. Moreover, the busy pulses emanate from the crosspoint itself thus allowing a simpler and more compact telephone system. Therefore, the line and controlling link circuits are greatly simplified with a resulting reduction in the cost of telephone systems.

With the foregoing descriptions of the logic symbols, the line circuit, and the crosspoint in mind, it is thought that the remaining structure, features, and advantages of the invention may be understood best by a description of a call as it is extended through the exchange.

Before a call is placed, an allotter 9 operates in any well known manner to preassign an idle link (assumed to be link 13) by marking the conductor designated "ALLOT" (FIG. 4). One example of an allotter such as this may be found in the U.S. patent application entitled "Electronic Switching Telephone System," Serial No. 837,400, filed September 1, 1959, now U.S. Patent No. 3,118,974, by Radcliffe and Pickering, and assigned to the assignee of this invention.

Since the station A is idle, the effective impedance of control winding 536 is relatively high and no busy pulse appears on conductor 12*a* during the time frame that identifies station A. More specifically, in an exemplary system, the scan pulse was a negative twelve volt pulse. There was a six volt drop across the winding 536 while core flux is driven from point *a* to point *b* (FIG. 5*a*). The resulting six volts applied over the vertical control conductor 12*a* was not sufficient to cause a breakdown diode, here shown as a zener diode Z1, in the link circuit to conduct. Thus, no busy marking is delivered to "OR" gate 441.

*Finder operation.*—To place a call, the subscriber at station A removes a telephone handset or receiver thereby closing a direct current loop which may be traced from negative battery through the filament of lamp 501, winding 500, subscriber set A, and winding 502 to ground. Also, a direct current loop is completed from battery through the filament of lamp 507, a winding 506*a* on transformer TR2, subscriber set A, the winding 506*b*, and the resistor 505 to ground. When a voltage is developed across resistor 505, the switch amplifier 511 turns "on." Responsive to the ensuing current flow, the "OR" gate 515 conducts to mark a private or sleeve conductor which is also the horizontal control conductor 10*c*.

Nothing further happens until the scanner 470 marks the output conductor 16 which individually identifies the calling subscriber station A. During the time frame when conductor 16 is marked by the scanner 470, the lower input terminal of "AND" gate 512 is energized. Since the switch amplifier 511 is also energizing the upper input terminal of "AND" gate 512, current flows through the isolating diode 516, thus marking the "OFF-HOOK" highway.

In the seize inhibit circuit 25 (FIG. 3), the signal on the "OFF-HOOK" highway is extended through an amplifier 312 to the right-hand terminal of inhibit gate 316. Capacitor 313 charges during each time frame when the scanner 470 pulses conductor 16 and discharges when the pulse is removed, all to maintain the current through the amplifier 312 and the inhibit gate 316.

The potential applied through the inhibit gate 316 and an amplifier 314 coincides at the input of "AND" gate 443 with the potential applied over the conductor "ALLOT" by the allotter 9. Capacitor 315 charges to maintain the input at this "AND" gate for a predetermined minimum time period. The "AND" gate 443 conducts and transmits a signal to the control terminal "C" of a gate circuit 442.

Means are provided in the link circuit for preparing to fire a crosspoint switch if there is an absence of a busy pulse on the vertical control conductor 12*a*. This is accomplished in the link at gate circuit 442 which is here shown as including a PNP junction type transistor Q4 having a breakdown or zener diode Z1 connected between its collector and emitter. The base electrode is normally biased positive relative to the emitter through a resistor R1, thus switching the transistor Q4 "off." When the control terminal C is pulsed negative by "AND" gate 443, the transistor Q4 switches "on" and current flows from conductor 12*a* through the collector-emitter circuit to ground through resistor R2. This current flow is relatively heavy, thus allowing a greater current flow in the control winding 536 and aiding rapid saturation of core 532. That is core flux is driven to point *c* of FIG. 5*a*. As explained above, the thyristor 550 switches "on" to draw current through winding 539 to help saturate the core.

Responsive to current flow through transistor Q4, "OR" gate 441 conducts and a signal is transmitted through an amplifier 440 to a holdover amplifier 455 which integrates the busy pulses that appear on conductor 12*a* and continuously energizes the lower input terminal of inhibit gate 456. The upper or inhibit terminal of gate 456 is not energized at this time. Therefore, a signal potential is extended through the inhibit gate 456 to the switch terminal of the tone gate 457. The dial tone which is applied in any suitable manner to the input terminal of gate 457 is extended through transformer 351, to the heavily inked message carrying or talking conductor 12*b* and the bilateral transistor 528 to the subscriber station A.

Also responsive to the output of the holdover amplifier 455, the "hold" conductor of the allotter is pulsed and the alloter steps on to allot the next idle link to serve the next call. In addition, the inhibit terminal of a "NOT" circuit 460 is energized. Prior to this time, the "NOT" circuit was energizing various reset circuits to be sure that all circuit components are in a normal condition when a call is received.

Means are provided for busy marking the link circuit during each time frame which identifies the subscriber station A. More particularly, after the time frame pulse terminates, the lower input terminal of "AND" gate 512 is deenergized. The off-hook signal is removed from the "OFF-HOOK" highway and from the input of "AND" gate 443 which turns "off." The negative pulse applied to the control terminal C of gate circuit 442 terminates and transistor Q4 turns "off." This is not important, however, because the core 532 has saturated and the impedance of winding 536 has dropped. Thus, substantially the full twelve volt output of scanner 470 reaches the zener diode Z1 via conductor 12*a* during each time frame that identifies station A. This twelve volts exceeds the breakdown voltage of the zener diode Z1 and the busy pulse is effective at the input of the "OR" gate 441. Therefore, during each time frame that identifies subscriber station A, a pulse is transmitted from amplifier 440 and over the "INPUT BUSY" highway to the seize inhibit circuit 25, and through amplifier 311 to inhibit gate 316. With gate 316 inhibited no pulse may be applied to the "LINK SEIZE" highway during the time frame of a busy station and there can be no seizure of station A through the "FINDER" matrix. This same busy pulse is applied through amplifier 311, and inhibit gate 320 to the inhibit terminal of gate 334 to prevent seizure of station A through the "CONNECTOR" matrix.

*Dialing.*—A subscriber at station A hears the dial tone and proceeds to operate any suitable signaling device such as a standard telephone dial to transmit directory information to the link circuit 13. This dial is adapted to transmit a series of open loop pulses over the telephone receive pair of conductors REC extending to the primary windings 506*a*, 506*b* of transformer TR2. Thus, if the subscriber transmits the digit 1, the loop including these windings is opened once; if the subscriber transmits the digit 2, this loop is opened twice, etc. Each dial pulse induces a pulse in the secondary winding 506*c* of transformer TR2 and a signal is extended over conductor 10*b*, through bilateral transistor 528, conductor 12*b*, conductor 435, and an amplifier 445 to the shift terminal "S" at each shift register stage.

As will become more apparent, start gate 446 marks the upper or inhibit terminal of gate 456 to deenergize the switch terminal of dial tone gate 457 which removes dial tone from the line. Also, a delay network 459 is energized to provide approximately 1.2 seconds delay. This delay is long enough to ensure the receipt of a complete digit pulse train for a six-line system. Longer delays my be provided in other systems.

*Registration.*—The register for storing the dial pulses is here shown as a shift register for six lines; however, the well known units, tens, and hundreds, etc. decade register will be used in larger systems.

Prior to the initiation of a call, the reset terminal (marked by a heavily inked dot) of each register stage is pulsed negatively to reset all stages in the shift register and ground all output terminals marked by a "D" or "T." Each dial pulse applies a positive pulse to all shift terminals "S." Responsive to the first dial pulse, stage RA negatively energizes its output terminal T1 and prepares stage RB. Responsive to the second pulse, stage RA grounds its output terminal T1, while stage RB negatively energizes its output terminal T2 and prepares stage RC. All succeeding stages operate in a similar manner responsive to successive dial pulses.

The circuits actually used in one exemplary shift register are shown in FIG. 4 immediately above the logic symbols. Specifically, these circuits include the start stage 446 and the first shift register stage RA. It will be apparent that the circuits for each succeeding stage RB . . . RN are the same as the circuit shown for stage RA.

Each register stage includes a pair of electronic switches which are transistors Q1, Q2, here shown as PNP junction type devices. The reset terminals are shown by heavily inked dots, marked "R," and the shift terminals are shown by a circle marked "S." The reset pulse is of negative polarity and the shift pulse is of positive polarity, as indicated by the waveforms adjacent the letters R and S respectively. The purpose of the remaining components will be apparent from the following description of the operation of the shift register.

When the negative reset pulse appears at the heavily inked terminals marked "R" the bases of transistor Q1 in the start stage 446 and transistor Q2′ in stage RA (and in each succeeding stage) are made negative relative to its emitter. Thus, these transistors turn "on." Referring to stage 446, by way of example, the emitter ground G1 of transistor Q1 appears at the terminal D and, therefore, at the junction of resistors R11, R12. The base of transistor Q2 is biased positive relative to its grounded emitter via a voltage divider (resistors R12 and R13) connected between grounded point D and battery B1. Therefore, transistor Q2 is held "off." With transistor Q2 "off," negative potential is extended through resistors R16, R15 to the base of transistor Q1, thus holding it in the "on" condition originally resulting from the appearance of the reset pulse. Also, this same negative potential is applied through resistor R16 and capacitor C3 to the base of transistor Q2′ which is in the "on" condition that originally resulted from an appearance of the reset pulse. The manner in which transistor Q1′ is held "off" will be apparent from the foregoing description of the bias applied to the base of transistor Q2.

When a positive shift pulse appears at each shift terminal S, transistor Q1 switches "off" because its base goes positive relative to its emitter. However, transistor Q1′ was "off" and, therefore, remains "off." As transistor Q1 switches "off," its emitter ground G1 is removed from terminal D, and the negative potential applied through resistor R11 appears, in lieu thereof. This negative potential is the signal that inhibits gates 444, 456 and starts timer 459. Also, when transistor Q1 removes its emitter ground G1 from terminal D, the negative battery applied through resistors R11, R12 switches "on" transistor Q2 by making its base negative relative to its emitter. When transistor Q2 turns "on," its emitter ground G2 appears at the junction of resistors R15, R16 which removes base drive current from transistor Q1 to hold it "off." The capacitors C1, C2 speed the transition periods while transistors Q1, Q2 switch "off" and "on," respectively. The transistors Q1, Q2 remain in their described states until the reset terminal R is again energized by a negative reset pulse to switch transistor Q1 "on" and, therefore, transistor Q2 "off." When transistor Q2 switches "on," its emitter ground G2 appears at terminal TO. This change in potential at terminal TO (from negative battery to ground) supplies a positive polarity pulse to the base of transistor Q2′ through capacitor C3. Since the base of transistor Q2′ goes positive relative to its emitter, it switches "off" and transistor Q1′ switches "on" in a manner similar to the described switching "on" of transistor Q2. When transistor Q2′ switches "off," its emitter ground is removed from output terminal T1 and negative battery appears in lieu thereof.

The circuits of each of the remaining stages in the shift register are the same as the circuit of stage RA. Thus, when a second positive shift pulse appears at the shift terminals S, the base of transistor Q1′ goes positive relative to its emitter; it turns "off"; transistor Q2′ turns "on"; ground replaces negative battery at terminal T1; and a transistor in stage RB similar to transistor Q2′ switches "off" to apply negative battery to terminal T2. In a similar manner each succeeding output terminal is pulsed negatively by successive dial pulses.

*Connector operation.*—Means are provided for selecting the time frame that identifies the called subscriber station B responsive to the directory information stored in the shift register. More particularly, for the purposes of this description, it is assumed that two digit pulses are received; therefore, the output or trigger terminal T2 of the shift register stage RB is energized at the end of the digit pulse train. Responsive thereto, an energizing current flows to the left-hand input terminal on "AND" gate 463. The scanner 470 is energizing each of the terminals A, B, C . . . N in turn during its individually associated time frame. Therefore, during the time frame which identifies subscriber station B, the right-hand terminal of "AND" gate 463 is energized to transmit a pulse through the "OR" gate 464 and an amplifier 330 to "AND" gate 331. The delay circuit 459 delays the energization of the left-hand terminal of "AND" gate 331 for a period of time that is long enough to ensure the receipt of a complete pulse train. But, 1.2 seconds after receipt of the first digit pulse, the left-hand input terminal of "AND" gate 331 is energized and when "AND" gate 463 conducts to energize the right-hand input terminal a pulse is transmitted through an amplifier 332 to the lower input terminal of "AND" gate 340, the upper input terminal of "AND" gate 342, and the right-hand terminal of inhibit gate 334.

*Busy test.*—If station B is busy, a pulse appears on the "INPUT BUSY HIGHWAY" during the time frame that identifies station B and when the right-hand terminal of "AND" gate 463 is energized; therefore, the inhibit terminal of gate 334 is energized just prior to the time when its right-hand terminal is energized owing to a short delay in amplifier 332, all to prevent the transmission of a pulse to the "LINE SEIZE HIGHWAY." Also, this same pulse on the "INPUT BUSY HIGHWAY" is applied to the lower input of "AND" gate 342 to trigger a flip-flop 346 which turns "on" to energize gate 354 and transmit busy tone from conductor BT through transformer 351 to the talking conductor 12*b* and station A.

Assuming that station B is idle at the time described, there is no pulse on the "INPUT BUSY HIGHWAY" when "AND" gate 463 conducts. Thus, gate 334 is not inhibited and a pulse is transmitted through the right-hand output of amplifier 335, and "OR" gate 321, to an inhibit terminal on gate 320. Inhibition of gate 320 prevents the busy marking (which is about to be returned when the connector matrix switches through) from prematurely blocking gate 334. The right-hand output of amplifier 335 also pulses terminal C′ of gate 442′ and, therefore, vertical control conductor 18*a*. The left-hand output of amplifier 335 is connected to the "LINE SEIZE HIGHWAY" which extends to one "AND" gate (such as 517, 400) in each of the line circuits, thus pulsing the upper input terminal of "AND" gates 517, 400. As will be apparent from the foregoing description of the line and crosspoint circuits, crosspoint 21 fires.

The right-hand output terminal of amplifier 335 also energizes the input terminal of flip-flip 350, thereby switching "on" gates 352, 353. Responsive thereto, ringing signal current flows from source RS over conductors 434, 18*b*, and the crosspoint 21 to the called station B where a call signal device sounds. Ringback tone is transmitted from source RBT, through gate 353, transformer 351, conductor 12*b*, transistor 528, conductor 10*b*, and transformer TR2 to subscriber station A.

*Answer supervision.*—The called telephone B sounds and nothing further happens until a subscriber removes a handset or receiver to close a D.C. loop across windings 574, 575. Current flows over this closed loop through current sensing resistor 573 and diode 403, resistor 404, to charge capacitor 405 and turn "on" switch amplifier 402 to energize the upper input terminal of "AND" gate 406. During the time frame when the scanner 470 is marking output B and conductor 16*a* the lower input terminal of "AND" gate 406 is energized, and output current flows through diode 407 to the "OFF-HOOK HIGHWAY" to charge capacitor 313, and to apply busy pulses to gate 316 and to the upper input terminal of "AND" gate 340. During the time frame which identifies the called station B, an output current flows from the register through the "AND" gate 463, "OR" gate 464, amplifier 330, "AND" gate 331, amplifier 332, and the lower input terminal of "AND" gate 340. There is a coincidence at "AND" gate 340 which triggers a timer 341. Timer 341 turns "on" and supplies a pulse of a predetermined period of time which is adequate to ensure proper operation of the gate circuits 352, 353. Thereafter, an energizing pulse is applied to the reset terminal (marked by a heavily inked dot) of the flip-flip 350, which turns "off." Thus, the tone gates are turned "off" to terminate the transmission of ringing signal RS and ringback tone RBT. Also current flow from timer 341 resets the register.

Whenever the time frame identifying station B occurs, a pulse is transmitted from scanner 470 over conductor 16*a*, through winding 536' in crosspoint 21, conductor 18*a*, zener diode Z1', amplifier 471, the "INPUT BUSY HIGHWAY." amplifier 311, inhibit gate 320 and the left-hand terminal of gate 334. Thus, gate 334 is inhibited and if any other subscriber calls station B, the pulse from "AND" gate 463 cannot get through to amplifier 335 in other links. The "LINE SEIZE HIGHWAY" is not pulsed and no connector crosspoint can fire.

*Release.*—The call is in progress and nothing further happens until the calling and called subscribers return their handsets or receivers to a hookswitch. Responsive thereto, the loop across each receive pair "REC" is broken, current ceases to flow through resistors 505, 573 and the switch amplifiers 511, 402 turn "off." Since the "LINE SEIZE HIGHWAY" is not energized after gate 334 is inhibited, the "AND" gates 400, 517 are "off."

Referring specifically to the line circuit 11 by way of example, the flow of current through switch amplifier 511, "OR" gate 515 and the conductor 10*c* to the collector C of thyristor 550 is interrupted. The thyristor turns "off" to deenergize the lower winding 539. Current flows from positive battery through resistor 540, transistor 550, winding 539, and resistor 547 to ground. This current flow drives the core 532 of saturable reactor SR to magnetic saturation in a direction which indicates that the crosspoint is not fired, i.e. point *a* on the hysteresis loop of FIG. 5*a*. Responsive thereto, the impedance of winding 536 increases because substantially all of the applied energy is used to drive core 532 toward (but not to) saturation point *c*. The result is that the potential on conductor 12*a* does not reach the zener breakdown voltage and zener diode Z1 prevents transmission of busy pulses to "OR" gate 441.

Thereafter, busy pulses do not appear on the "INPUT BUSY HIGHWAY" during the time frames that identify stations A, B, and either may be seized as described above.

It is to be understood that the foregoing description of a specific example of the invention is not to be construed as a limitation upon its scope.

I claim:

1. An electronic switching telephone system comprising an electronic crosspoint matrix including horizontal and vertical voice path and control path multiples, a plurality of subscriber lines each terminated by a line circuit, each of said line circuits having access to said matrix via an individually associated horizontal multiple, a plurality of link circuits, each of said link circuits having access to said matrix via at least one individually associated vertical multiple, a scanner for producing a plurality of cyclically recurring time frames, means for coupling each of said line circuits to said scanner to be energized during an individually associated time frame, means for coupling said scanner to each of said link circuits for sequentially energizing said link circuits during each of said time frames, means in each of said link circuits for selecting a desired time frame in accordance with directory information received during a given call, an off-hook highway and a line seize highway common to said line circuits and to said link circuits, means for energizing said off-hook highway during time frames which identify individual stations when in an off-hook condition, means in said link circuits for energizing said line seize highway and an individually associated vertical multiple during said selected time frame, means responsive to said last named means for completing a circuit through said matrix, and means interposed between said highways and said link circuits for preventing the simultaneous operation of more than one link circuit at any given time and for preventing the operation of a link during a time frame which identifies a busy station, thereby preventing cross connections between independent calls.

2. An electronic switching telephone system comprising an electronic crosspoint matrix including intersecting horizontal and vertical multiples, each multiple including at least one voice conductor and one control conductor, a plurality of subscriber lines each terminated by a line circuit, each of said line circuits having access to said matrix via an individually associated horizontal multiple, a plurality of link circuits, each of said link circuits having access to said matrix via at least one individually associated vertical multiple, means for producing a plurality of cyclically recurring time frames, means for coupling each of said line circuits to said last named means to energize a control conductor in the associated horizontal multiple during an individually associated time frame, means in each link circuit for energizing a control conductor in the associated vertical multiple during the time frame which identifies a crosspoint that is to be fired, electronic switching means and an individually associated memory means at each of said crosspoints, said memory means including a saturable reactor having a core and a plurality of windings, one of said windings being connected between control conductors in the vertical and horizontal multiples that intersect at a crosspoint, whereby the core flux of the associated saturable reactor is driven to saturation in a first magnetic direction during the time frame when the control conductors of intersecting horizontal and vertical multiples are energized simultaneously, and means responsive to the change of impedance in said one winding when said core saturates in said first magnetic direction for transmitting a busy marking between said horizontal control conductor and said vertical control conductor which are interconnected by said one winding.

3. An electronic switching telephone system comprising a matrix including a plurality of first and second groups of conductors arranged to provide intersecting crosspoints, each of the groups including message carrying conductors and control conductors, electronic switch means at each of the crosspoints for effectively coupling the message carrying conductors which intersect thereat when said switch means is turned "on," memory means including a saturable reactor at each of said crosspoints, each of the reactors including a core and a plurality of windings, a control winding of each of said reactors connected between the control conductors of said first and second groups of lines which intersect at the individually associated crosspoint, means responsive to saturation of the core of said saturable reactor in a first magnetic direction for switching "on" said electronic switching means at the individually associated crosspoint, and means responsive to saturation of the core in an opposite magnetic direction for indicating that said electronic switching means is turned "off."

4. An electronic switching telephone system comprising a matrix including a plurality of first and second groups of conductors arranged to provide intersecting crosspoints, each of the groups including message carrying conductors and control conductors, electronic switch means at each of the crosspoints for effectively coupling the message carrying conductors which intersect thereat when the associated electronic switch means is turned "on," a saturable reactor including a core and a plurality of windings at each of said crosspoints, a control winding of each of said reactors connected between the control conductors of said first and second groups of lines which intersect at an individually associated one of said crosspoints, means for cyclically and sequentially energizing the control conductors of said first groups of conductors, means for selectively energizing the control conductor of a particular group of conductors among said second groups of conductors during a preselected time frame to complete a circuit through the control winding at a crosspoint where the particular group of conductors intersect the group among said first groups having a control conductor energized during said preselected time frame, whereby the core associated with the energized control winding is saturated in a first magnetic direction, means responsive to said saturation of the core in said first magnetic direction for switching "on" said electronic switching means associated therewith, means responsive to deenergizing said control conductor of said particular group for saturating in an opposite magnetic direction the core associated with said energized control winding, and means responsive to said last named means for switching said electronic switching means "off."

5. An electronic switching telephone system comprising a matrix including a plurality of first and second groups of conductors arranged to provide intersecting crosspoints, each of the groups including message carrying conductors and control conductors, electronic switch means at each of the crosspoints for effectively coupling the message carrying conductors which intersect thereat, means including a saturable reactor having a core and a plurality of windings at each of said crosspoints; each of said electronic switch means includes at least one bilateral transistor having a first emitter-collector connected to a message carrying conductor in said first group of conductors, a second emitter-collector coupled to a message carrying conductor in said second group of conductors, and a control electrode connected to a winding of said saturable reactor; a control winding of said saturable reactor connected between the control conductors of said first and second groups of lines which intersect at a crosspoint, means responsive to saturation of the core of said saturable reactor in a first magnetic direction for switching said electronic switching means "on," and means responsive to saturation of the core of said saturable reactor in an opposite magnetic direction for indicating that said electronic switching means is turned "off."

6. An electronic switching telephone system comprising a matrix including a plurality of first and second groups of conductors arranged to provide intersecting crosspoints, each of the groups including message carrying conductors and control conductors, electronic switch means at each of the crosspoints for effectively coupling the message carrying conductors which intersect thereat, means including a saturable reactor at each of said crosspoints, each of said reactors including a core and a plurality of windings, said electronic switch means includes at least one bilateral transistor for each intersection of a pair of message carrying conductors, said transistors having a first emitter-collector electrode connected to a message carrying conductor in said first group, and a second emitter-collector electrode coupled to a message carrying conductor in said second group, and a control electrode connected to a winding of said saturable reactor, a control winding of said saturable reactor connected between the control conductors of said first and second groups of lines which intersect at said crosspoints, means for cyclically and successively energizing said control conductors of said first groups of conductors, means for selectively energizing the control conductor of one of said second groups simultaneously with the energization of one of said control conductors in a first of said groups whereby said core saturates in a first magnetic direction, means responsive to the saturation of a core in said first magnetic direction for switching said electronic switching means "on," and means responsive to saturation of the core of said saturable reactor in an opposite magnetic direction for indicating that said electronic switching means is turned "off."

7. An electronic switching telephone system comprising a matrix including a plurality of first and second groups of conductors arranged to provide intersecting cross-points, each of the groups including message carrying conductors and control conductors, means including electronic devices at each of the crosspoints for effectively coupling the message carrying conductors which intersect thereat, memory means including a magnetic device at each of said crosspoints for controlling said electronic devices and for transmitting busy signals when the crosspoint is closed, and means responsive to a coincidence of time signals for controlling said magnetic and electronic devices if no busy signals are then present.

8. A self-controlled electronic crosspoint for extending message carrying conductors which intersect at said crosspoint comprising a saturable reactor having a core, a control winding, and at least one secondary winding, means for cyclically energizing said control winding during particular time frames among a number of successively recurring time frames to bias the magnetic flux of said core toward but not to magnetic saturation in a first magnetic direction, means effective at the termination of each of said cyclic energizations of said saturating winding for driving the flux of said core back to magnetic saturation in an opposite magnetic direction, means responsive to a control signal for driving said core flux to saturation in said first magnetic direction during a selected one of said particular time frames, means also responsive to said control signal for causing said crosspoint to complete a circuit between said message carrying conductors which intersect thereat, and means thereafter responsive to said cyclic energizations of said control winding for transmitting busy signals indicating that said crosspoint has fired.

9. An electronic crosspoint comprising a saturable reactor having a core, a control winding, and at least one secondary winding, means for cyclically energizing said saturating winding during particular time frames to bias the magnetic flux of said core toward but not to magnetic saturation in a first magnetic direction, means effective at the termination of each of said cyclic energizations of said control winding for driving the flux of said core back to magnetic saturation in an opposite magnetic direction, means responsive to a control signal for driving said core flux to saturation in said first direction during a selected one of said time frames, an electronic switch including a thyristor and at least one bilateral transistor at said crosspoint, means responsive to core flux change occurring at said core saturates in said first direction for triggering said thyristor to an "on" condition, means responsive to current flow through said thyristor for speeding saturation and for thereafter holding said core saturated in said first magnetic direction, means also responsive to current flow through said thyristor for switching "on" said bilateral transistor, and means responsive to said cyclic energizations of said control winding after saturation of said core in said first direction for transmitting busy signals indicating that said crosspoint has fired.

10. The electronic crosspoint of claim 9 and means for interrupting the emitter-collector circuit of said thyristor to turn "off" said crosspoint, and means responsive to said thyristor turning "off" for driving said core flux back to saturation in said opposite magnetic direction and for switching "off" said bilateral transistor.

11. A self-controlled electronic crosspoint for selectively interconnecting message carrying conductors which intersect at that crosspoint comprising a saturable reactor having a core, a control winding, and at least one secondary winding, means for cyclically energizing said control winding during particular time frames among a number of successively recurring time frames to bias the magnetic flux of said core toward but not to magnetic saturation in a first magnetic direction whereby substantially all energy applied across said control winding during said particular time frames goes to change core flux thus producing a relatively large voltage drop across the winding, means effective at the termination of each of said cyclic energizations of said control winding for driving the flux of said core back to magnetic saturation in an opposite magnetic direction, means responsive to a control signal for driving said core flux to saturation in said first magnetic direction during a selected one of said particular time frames whereby the voltage drop across said control winding is relatively small when said control winding is energized cyclically during said particular time frames, means also responsive to said control signal for causing said crosspoint to interconnect the message carrying conductors intersecting thereat, and means coupled to said control winding and controlled by the relatively large or small voltage drops across said control winding for preventing operation of associated crosspoints after said crosspoint has fired.

12. A time controlled switching device comprising a saturable reactor having a control winding connected in series with a parallel circuit, one arm of said parallel circuit including a breakdown diode and the other arm of said parallel circuit including an electronic switch means, means for cyclically energizing said control winding by recurring time frame pulses of uniform voltage, the voltage drop across said control winding when said reactor is not saturated in a given magnetic direction being such that said breakdown diode does not reach firing potential when energized by said uniform voltage pulses, the voltage drop across said control winding when said reactor is saturated in said given direction being such that said breakdown diode does fire when energized by said uniform voltage pulses, and means responsive to the operation of said electronic switch for saturating said reactor in said given magnetic direction.

13. A time controlled switching device comprising a saturable reactor having a control winding connected in series with a parallel circuit, one arm of said parallel circuit including a zener diode and the other arm of said parallel circuit including an electronic switch means, means for cyclically energizing said control winding by recurring time frame pulses of uniform voltage, the voltage drop across said control winding when said reactor is not saturated in a given magnetic direction being such that said zener diode does not reach breakdown voltage when energized by said uniform voltage pulses, the voltage drop across said control winding when said reactor is saturated in said given direction being such that said zener diode does break down when energized by said uniform voltage pulses, means responsive to the operation of said electronic switch for saturating said reactor in said given magnetic direction, and means responsive to saturation of said reactor in said given direction for operating said time controlled switching device.

14. A time controlled switching device comprising a saturable reactor having a control winding connected in series with a parallel circuit, one arm of said parallel circuit including a breakdown diode and the other arm of said parallel circuit including an electronic switch means, means for cyclically energizing said control winding by recurring time frame pulses of uniform voltage, the voltage drop across said control winding when said reactor is not saturated in a given magnetic direction being such that said breakdown diode does not reach firing potential when energized by said uniform voltage pulses, the voltage drop across said control winding when said reactor is saturated in said given direction being such that said breakdown diode does fire when energized by said uniform voltage pulses, means responsive to the operation of said electronic switch for saturating said reactor in said given magnetic direction, a thyristor and at least one bilateral transistor, means responsive to saturation of said reactor for triggering said thyristor, means responsive to current flow through said thyristor for holding said reactor in saturation and for switching "on" said bilateral transistor, and means responsive to interruption of current flow through said thyristor for switching "off" said bilateral transistor and for driving said reactor away from saturation in said given magnetic direction.

References Cited by the Examiner

UNITED STATES PATENTS

| | | | |
|---|---|---|---|
| 2,914,617 | 11/59 | Fritschi et al. | 179—18 |
| 2,949,504 | 8/60 | Rubinoff | 179—18.7 |
| 2,987,579 | 6/61 | Dunlap | 179—18.7 |

ROBERT H. ROSE, *Primary Examiner.*

WALTER L. LYNDE, *Examiner.*